O. A. KOTTEMANN.
TIRE.
APPLICATION FILED MAY 15, 1916.
1,233,277.
Patented July 10, 1917.
2 SHEETS—SHEET 2.
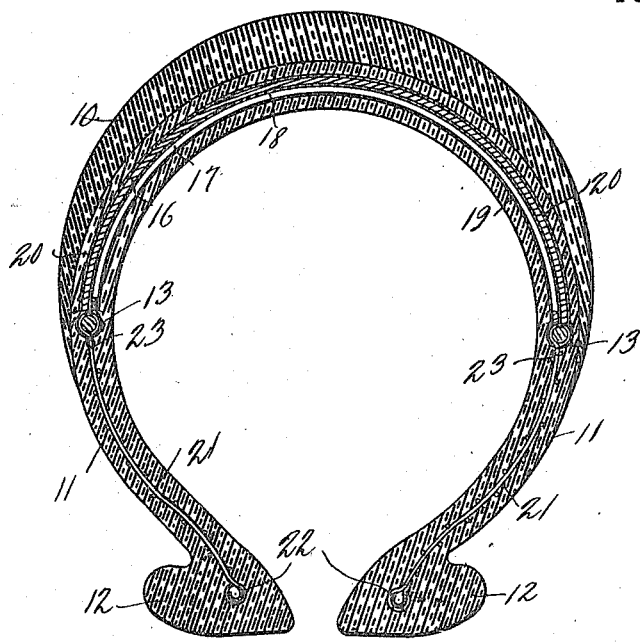
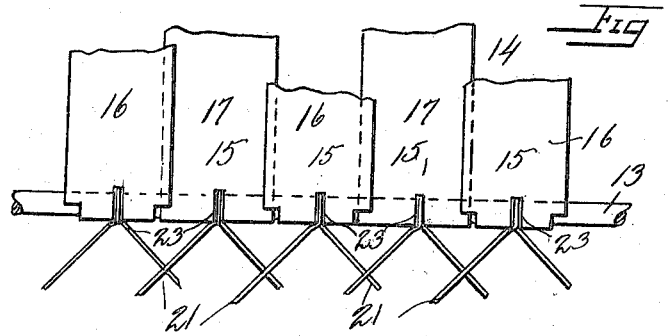
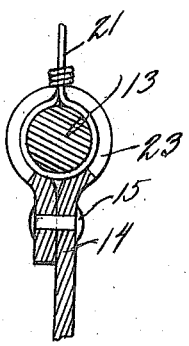
Inventor
O. A. Kottemann

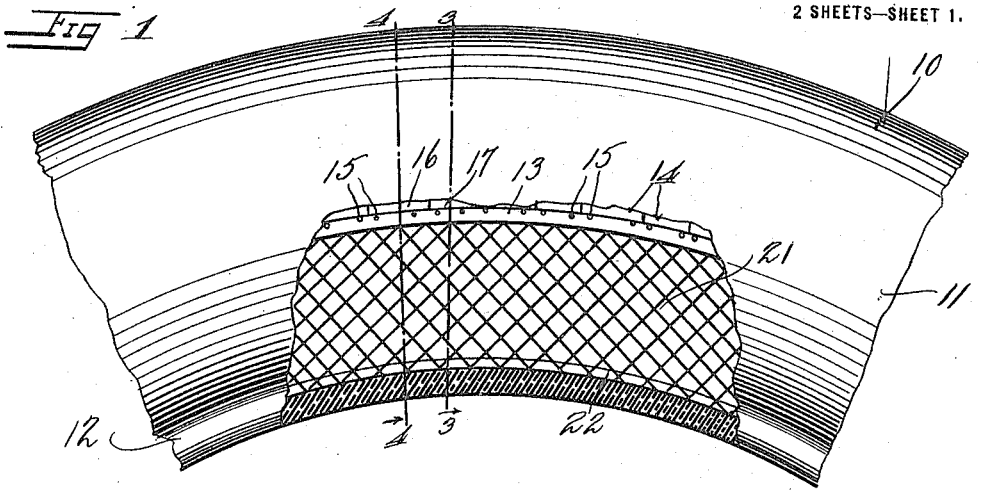
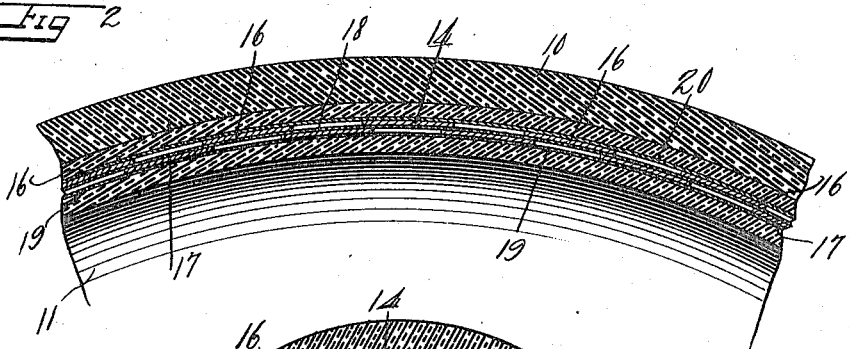
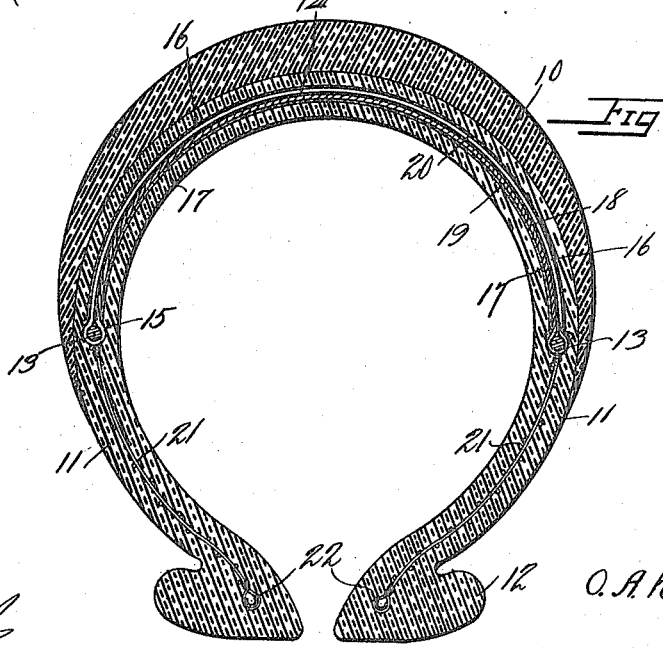

UNITED STATES PATENT OFFICE.

OTTO A. KOTTEMANN, OF ST. LOUIS, MISSOURI, ASSIGNOR OF FORTY-NINE ONE-HUNDREDTHS TO EDWARD A. HOLZ, CLAUDE L. CASE, J. C. HOLZ, AND JAMES H. JONES.

TIRE.

1,233,277. Specification of Letters Patent. Patented July 10, 1917.

Application filed May 15, 1916. Serial No. 97,682.

*To all whom it may concern:*

Be it known that I, OTTO A. KOTTEMANN, a citizen of the United States, residing at St. Louis, State of Missouri, have invented certain new and useful Improvements in Tires; and I do hereby declare the following to be a full, clear, and exact description of the invention, such as will enable others skilled in the art to which it appertains to make and use the same.

This invention relates to tires, and particularly to penumatic tires, the primary object of the invention being to provide means whereby the outer case of a pneumatic tire is rendered puncture proof, thereby materially increasing the life and durability of the tire and avoiding trouble incident to punctures and blowouts, and whereby the tread casing is materially strengthened or reinforced to resist ruptures and wear.

A further object of the invention is to provide an armored tire casing for attaining the above mentioned ends, which is so arranged within the casing as to preclude breakage or derangement of the armor plates, and to prevent cutting or wearing of the tire case by the various armor plates.

A still further object of the invention is to provide a tire of this type which is of comparatively simple and inexpensive construction, which is composed of comparatively few readily assembled parts, which will materially lengthen the life and durability of the tire and which will prove thoroughly efficient in practice.

With these objects in view, together with others which will appear as the description proceeds, the invention resides in the novel combination and arrangement of parts, all as will be described more fully hereinafter, illustrated in the drawings and particularly pointed out in the claims.

The invention will be best understood by reference to the accompanying drawings, wherein:

Figure 1, is a side elevation of a portion of a tire constructed in accordance with my invention, parts of the tire being broken away to show the underlying structure, Fig. 2, is a longitudinal sectional view through the tire, Fig. 3, is a transverse sectional view taken on line 3—3 of Fig. 1, Fig. 4, is a transverse sectional view taken on line 4—4 of Fig. 1, Fig. 5, is an enlarged plan view through the armor removed from the case, and Fig. 6, is an enlarged detail view of the means for connecting the tread and wall armors.

Referring now more particularly to the drawings 10 indicates the thickened tread portion of a conventional form of tire, the same being connected at its opposite longitudinal edges with the wall portions 11 of the tire, the latter terminating at their free ends in annular edge portions by which the case is secured to the wheel rim.

In the preferred embodiment of the invention, endless rings 13 are embedded in the tire case at the juncture of the tread portion with the side walls, the said rings comprising solid metallic cables or wires. The tread armor comprises a plurality of arcuate plates 14, the said plates being embedded in the casing fabric and having their ends wrapped around the rings 13 and secured rigidly thereto by rivets (Fig. 6). These plates are formed of thin spring steel whereby the necessary resiliency of the tread portion of the tire will not be impaired, the said plates being of relatively narrow width, and certain of the plates are arranged to overlap the adjacent edges of the intermediate plates. The overlapping plates are indicated at 16, while the intermediate plates are designated by the numeral 17, the latter plates being concentric with the plates 16, but of slightly less diameter, whereby when the two sets of plates are connected to the rings 13 a slight space will be provided between the innermost periphery of the plates 16 and the outermost periphery of the intermediate plates 17. A sheet of fabric 18, such as heavy canvas is inserted between the plates at the tread portion when arranged in the manner above mentioned, the said fabric extending entirely around the tire case, and being in width substantially equal to the length of the various tread armor plates. Similar strips or sheets of fabric 19 and 20 are arranged upon the inner and outer faces respectively of the said arcuate armor plates, and may be connected to the intermediate fabric strip 18 at the various points throughout the circumference of the case where the said fabric strip 18 is exposed by stitching or cement as preferred. From this description it is seen that the tire armor thus provided forms an efficient means for protecting the thin inner air tube inclosed by the case against punctures, and at the same time reinforces the tread portion of the case.

The reinforcing or strengthening means for the side walls 11 of the case consists of wire fabric 21 of relatively close mesh. This fabric is made of a length to extend clear around the tire, and is of a width to extend from the rings 13 into the edge portions 12, the said fabric being embedded in the walls of the case as shown. Endless rings 22 are arranged in the edge portions 12, the said rings being formed of a metallic strip bent into substantially U-shape, and around which one of the longitudinal edges of the wall reinforcing fabric is secured. In that type of tire casings having their annular edge portions enlarged to provide clencher beads, these rings may be embedded in such beads. In order to secure the fabric 21 to the rings 13, the plates 16 and 17 are slotted throughout the end portions which surround the rings or wires 13, as shown at 23 in Fig. 5, and the ends of the wires forming the fabric are wrapped a number of times around the rings 13 through the slots 23. When the fabric is drawn tight and securely embedded within the tire case it is apparent that an efficient case armor is provided, and yet a reinforcing means of such nature as to enable the tire case to bend sufficiently to conform to the various irregularities in the road over which the wheel is traveling. It is also to be observed that the particular manner in which the tread plates are assembled within the case prevents cutting of the fabric or gum of the tread portion, and yet at the same time does not detract from the flexibility of the same.

While I have herein shown and described a particular or preferred embodiment of the invention, I wish it to be understood that I need not confine myself to all the precise details of construction and arrangement of parts, herein set forth by way of illustration, as modification and variation may be made without departing from the spirit of the invention or exceeding the scope of the claims.

What is claimed is:

A reinforcement for a tire casing consisting of a series of narrow plates embedded in the casing and extending longitudinally in a direction transverse the tire and curved to conform to the transverse curvature of the tire, each alternate plate having its side edges overlapping the side edges of the adjacent plates, the ends of each plate being reduced in width and centrally slotted, a pair of wires extending circumferentially around the casing in each side thereof and having said slotted ends bent around them, and reinforcements each having wires along one edge engaged around the respective wires of the pair in said slots whereby to keep said plates from slipping and maintain the reinforcements adjacent the plates in proper spaced relation.

In testimony whereof, I affix my signature, in the presence of two witnesses.

OTTO A. KOTTEMANN.

Witnesses:
 CLAUDE L. CASE,
 EDWARD A. HOLZ.

Copies of this patent may be obtained for five cents each, by addressing the "Commissioner of Patents, Washington, D. C."